United States Patent Office 3,004,044
Patented Oct. 10, 1961

3,004,044
1-DEHYDRO-6-FLUORO-11-OXYGENATED PROGESTERONES
J Allan Campbell, Kalamazoo, John C. Babcock, Portage Township, Kalamazoo County, and John A. Hogg, Kalamazoo, Mich., assignors to The Upjohn Company, Kalamazoo, Mich., a corporation of Michigan
No Drawing. Filed June 9, 1958, Ser. No. 740,569
10 Claims. (Cl. 260—397.3)

This invention relates to novel 6α-fluoro and 6β-fluoro steroid compounds. It relates more particularly in their 6α and 6β epimer form to 1-dehydro-6-fluoro-11β-hydroxyprogesterone (6-fluoro-11β-hydroxy-1,4-pregnadiene-3,20-dione), 1-dehydro-6-fluoro-11α-hydroxyprogesterone (6-fluoro-11α-hydroxy-1,4-pregnadiene-3,20-dione), and 1-dehydro-6-fluoro-11-ketoprogesterone (6-fluoro-1,4-pregnadiene-3,11,20-trione) and to processes for the production thereof.

This application is a continuation in part of copending application Serial No. 699,503, filed November 29, 1957, now Patent No. 2,838,501 issued June 10, 1958.

The new compounds and the process of the present invention are illustratively represented by the following formulae:

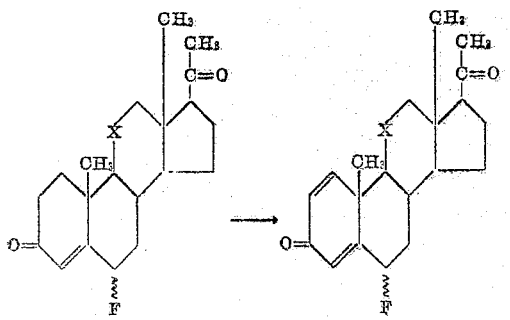

wherein X is selected from the group consisting of the carbonyl radical (>C=O), the β-hydroxymethylene radical

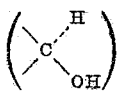

or the α-hydroxymethylene radical

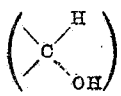

In this application the wavy line ( ⌇ ) appearing at the 6-position is a generic expression including the alpha (α) and beta (β) configuration.

The process of the present invention comprises: subjecting a 6-fluoro-11-oxygenated-progesterone to biological dehydrogenation using microorganisms, for example, Septomyxa, or to chemical dehydrogenation with selenium dioxide to produce the corresponding 1-dehydro-6-fluoro-11-oxygenated-progesterone.

The compounds of this invention possess valuable glucocorticoid and anti-inflammatory activities. These compounds are useful in the treatment of inflammatory conditions of the skin, eyes and ears of humans and of valuable domestic animals, as well as contact dermatitis and other allergic reactions.

Compositions containing the compounds of the present invention can be prepared for human or animal use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products. The novel compounds can also be administered topically in the form of ointments, creams, lotions, and the like, with or without coacting antibiotics, germicides, or other materials forming advantageous combinations therewith.

The starting materials for the present invention are 6α-fluoro-11β-hydroxyprogesterone, 6β-fluoro-11β-hydroxyprogesterone, 6α-fluoro-11α-hydroxyprogesterone, 6β-fluoro-11α-hydroxyprogesterone, 6α-fluoro-11-ketoprogesterone and 6β-fluoro-11-ketoprogesterone. These starting materials can be prepared in accordance with the process disclosed in copending application Serial No. 699,503, filed November 29, 1957.

According to the process of the present invention, dehydrogenation of the selected 6-fluoro-11-oxygenated progesterone to obtain the Δ¹-analogue thereof is carried out either by fermentative or chemical dehydrogenation. Microorganisms such as Septomyxa, Corynebacterium, Fusarium, and the like, are used under fermentation conditions well known in the art (e.g., U.S. 2,602,769) and furthermore illustrated by Examples 1 through 6 herein. The chemical dehydrogenation can be carried out with selenium dioxide according to procedures well known in the art and illustrated in detail by Example 7.

Illustrative of the compounds thus produced are 1-dehydro-6α-fluoro-11β-hydroxyprogesterone, 1-dehydro-6β-fluoro-11β-hydroxyprogesterone, 1-dehydro-6α-fluoro-11α-hydroxyprogesterone, 1-dehydro-6β-fluoro-11α-hydroxyprogesterone, 1-dehydro-6α-fluoro-11-ketoprogesterone, and 1-dehydro-6β-fluoro-11-ketoprogesterone. The 1-dehydro-6β-fluoro compounds, for example, 1-dehydro-6β-fluoro-11β-hydroxyprogesterone, are obtained when the corresponding 6β-fluoro starting steroid, for example, 6β-fluoro-11β-hydroxyprogesterone, is subjected to dehydrogenation under near neutral reaction conditions.

The 1-dehydro-6β-fluoro-11β-hydroxyprogesterone, 1-dehydro-6β-fluoro-11α-hydroxyprogesterone, and 1-dehydro-6β-fluoro-11-ketoprogesterone thus obtained can be converted by epimerization to 1-dehydro-6α-fluoro-11β-hydroxyprogesterone, 1-dehydro-6α-fluoro-11α-hydroxyprogesterone, and 1-dehydro-6α-fluoro-11-ketoprogesterone, respectively. Conversion of the selected 6β-epimer to the 6α-epimer can be accomplished by treatment at temperatures of zero degrees centigrade, or slightly higher or lower temperatures in an organic solvent, such as chloroform, methylene chloride, ether, and the like, and in the presence of a prototropic agent (proton-donating reagent) such as alcohols, organic acids, and the like, with a hydrogen halide, such as hydrogen chloride gas. The mixture should be maintained at temperatures near zero degrees centigrade, although slightly higher or lower temperatures can be used, during the addition of the acid. The reaction mixture can then be washed with successive portions of dilute alkali and water, and then dried and evaporated under reduced pressure. The 6α-fluoro product can be recovered from the crude reaction product and purified by recrystallization.

Alternatively, the epimerization can be accomplished with alkali. Bases, for example, solutions of sodium hydroxide and potassium hydroxide, may be used to treat the 6β-epimer in solution in an organic solvent, such as methanol, to produce the 6α-epimer.

The following examples are illustrative of the process and products of the present invention, but are not to be construed as limiting.

EXAMPLE 1

*1-dehydro-6α-fluoro-11β-hydroxyprogesterone (6α-fluoro-11β-hydroxy-1,4-pregnadiene-3,20-dione)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 r.p.m.) and aerated (0.1 liter of air per minute to ten liters of beer). After twenty hours of incubation, when a good growth has been developed, one gram of 6α-fluoro-11β-hydroxyprogsterone dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone and the extracts of the beer are combined, dried over anhydrous sodium sulfate and evaporated and the resulting residue chromatographed over a Florisil anhydrous magnesium silicate column. The column is packed with 100 grams of Florisil synthetic magnesium silicate and is developed with 200-milliliter fractions each of Skellysolve B hexane-acetone mixtures of 9:1, 8:2, 7:3 and 1:1. The fraction eluted with Skellysolve B-acetone (9:1) is twice recrystallized from acetone-Skellysolve B hexanes to give 6α-fluoro-11β-hydroxy-1,4-pregnadiene-3,20-dione, a crystalline solid. Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, tricothecium, Leptosphaeria, Cucurbitaria, Nocardia and enzymes of fungi of the family Tuberculariaceae can be used to introduce a Δ¹-bond into 6α-fluoro-11β-hydroxyprogesterone.

EXAMPLE 2

*1-dehydro-6α-fluoro-11α-hydroxyprogesterone (6α-fluoro-11α-hydroxy-1,4-pregnadiene-3,20-dione)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with spores of *Septomyxa affinis* A.T.C.C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 r.p.m.) and aerated (0.1 liter of air per minute to ten liters of beer). After twenty hours of incubation, when a good growth has been developed, one gram of 6α-fluoro-11α-hydroxyprogesterone dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The column is packed with 100 grams of Florisil and is developed with 200-milliliter fractions each of Skellysolve B hexane-acetone mixtures of 9:1, 8:2, 7:3 and 1:1. The crystalline material which is obtained from the Skellysolve B hexanes-acetone elutions (9:1 and 8:2) is recrystallized from Skellysolve B hexanes-acetone to give 6α-fluoro-11α-hydroxy-1,4-pregnadiene-3,20-dione, a crystalline solid.

Species of the other organisms named in Example 1 can be used to introduce a Δ¹-bond into 6α-fluoro-11α-hydroxyprogesterone.

EXAMPLE 3

*1-dehydro-6α-fluoro-11-ketoprogesterone (6α-fluoro-1,4-pregnadiene-3,11,20-trione)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a two day vegetative growth of *Septomyxa affinis* A.T.C.C. 6737. The Erlenmeyer flasks are shaken at room temperature (about 26 to 28 degrees centigrade) for a period of three days. At the end of this period this 500-milliliter volume is used as an inoculum for five liters of the same glucose-corn steep liquor medium which in addition contains five milliliters of an antifoam compound (a mixture of lard oil and octadecanol). The fermenter is placed into the water-bath, adjusted to 28 degrees centigrade and the contents stirred (300 r.p.m.) and aerated (0.1 liter of air per minute to ten liters of beer). After twenty hours of incubation, when a good growth has been developed, one gram of 6α-fluoro-11-ketoprogesterone plus one half gram of 3-keto-bisnor-4-cholen-22-al dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The column is packed with 100 grams of Florisil synthetic magnesium silicate and is developed with 200-milliliter fractions each of Skellysolve B hexane-acetone mixtures of 9:1, 8:2, 7:3 and 1:1. The fraction eluted with Skellysolve B hexane-acetone (9:1) is twice recrystallized from acetone-Skellysolve B hexanes to give 1-dehydro-6α-fluoro-11-ketoprogesterone, a crystalline solid.

Instead of Septomyxa, species of other genera named in Example 1 can be used to introduce a Δ¹-bond into 6α-fluoro-11-ketoprogesterone.

EXAMPLE 4

*1-dehydro-6β-fluoro-11β-hydroxyprogesterone (6β-fluoro-11β-hydroxy-1,4-pregnadiene-3,20-dione)*

Substituting 6β-fluoro-11β-hydroxyprogesterone for 6α-fluoro-11β-hydroxyprogesterone and following the procedure of Example 1 produces 1-dehydro-6β-fluoro-11β-hydroxyprogesterone (6β-fluoro-11β-hydroxy-1,4-pregnadiene-3,20-dione), a crystalline solid.

EXAMPLE 5

*1-dehydro-6β-fluoro-11α-hydroxyprogesterone (6β-fluoro-11-α-hydroxy-1,4-pregnadiene-3,20-dione)*

Substituting 6β-fluoro-11α-hydroxyprogesterone for 6α-fluoro-11α-hydroxyprogesterone and following the procedure of Example 2 produces crystalline 1-dehydro-6β-fluoro-11α-hydroxyprogesterone (6β-fluoro-11α-hydroxy-1,4-pregnadiene-3,20-dione).

EXAMPLE 6

*1-dehydro-6β-fluoro-11-ketoprogesterone (6β-fluoro-1,4-pregnadiene-3,11,20-trione)*

Substituting 6β-fluoro-11-ketoprogesterone for 6α-fluoro-11-ketoprogesterone and following the procedure of Example 3 produces crystals of 1-dehydro-6β-fluoro-11-ketoprogesterone (6β-fluoro-1,4-pregnadiene-3,11,20-trione).

EXAMPLE 7

*1-dehydro-6α-fluoro-11-ketoprogesterone*

A solution of 0.5 gram of 6α-fluoro-11-ketoprogesterone, 0.5 gram of selenium dioxide, 50 milliliters of tertiary butyl alcohol and 1.5 milliliters of acetic acid was heated at reflux in a nitrogen atmosphere for seven hours. Most of the solvent was evaporated under a fast stream of nitrogen. The concentrate thus obtained was diluted with methylene chloride and filtered. The filtrate was washed twice with dilute sodium hydroxide solution, dilute hydrochloric acid and water, and then dried over magnesium sulfate and concentrated by evaporation under a stream of nitrogen. The crude product was chromatographed through a 100 gram Florisil synthetic magnesium silicate column. The column was eluted with successive 500 milliliter volumes of six percent, eight percent, ten percent and twelve percent acetone in Skellysolve B hexanes, followed by one liter of fourteen percent acetone in Skellysolve B hexanes. The eluates were collected in 250 milliliter fractions as follows:

Fractions 1–2 Skellysolve B hexanes plus six percent acetone
Fractions 3–4 Skellysolve B hexanes plus eight percent acetone
Fractions 5–6 Skellysolve B hexanes plus ten percent acetone
Fractions 7–8 Skellysolve B hexanes plus twelve percent acetone
Fractions 9–12 Skellysolve B hexanes plus fourteen percent acetone Fractions 8–11 containing the desired product contaminated with starting material were evaporated to dryness. The crude product was dissolved in about three milliliters of boiling methanol and 0.2 milliliter of pyrrolidine was added. The solution was boiled under nitrogen for one minute to convert the contaminating starting material to its enamine. The solution was chilled, diluted with methylene chloride and washed with iced 3 N hydrochloric acid and water, dried over magnesium sulfate and filtered. The solution was concentrated to about five milliliters and chromatographed through a fifty gram Florisil synthetic magnesium silicate column. The column was eluted successively with 300 milliliter volumes of four percent, six percent, ten percent and twelve percent acetone in Skellysolve B hexanes followed by 600 milliliters of fourteen percent acetone in Skellysolve B hexanes. The eluates were collected in 150 milliliter fractions as follows:

Fractions 1–2 Skellysolve B hexanes plus four percent acetone
Fractions 3–4 Skellysolve B hexanes plus six percent acetone
Fractions 5–6 Skellysolve B hexanes plus ten percent acetone
Fractions 7–8 Skellysolve B hexanes plus twelve percent acetone
Fractions 9–12 Skellysolve B hexanes plus fourteen percent acetone Fractions 8–11 were concentrated to dryness and the residues obtained were combined and recrystallized twice from acetone-Skellysolve B hexanes to yield 16.8 milligrams of 1-dehydro-6α-fluoro-11-ketoprogesterone having a melting point of 193 to 199 degrees centigrade, $[\alpha]_D$ plus 200 degrees in chloroform, and $$\lambda_{max.}^{alc.} \ 238 \ m\mu \ a_M = 15,900.$$

*Analysis.*—Calculated for $C_{21}H_{25}FO_3$: C, 73.23; H, 7.32. Found: C, 73.17; H, 7.30.

In the same manner, substituting 6α-fluoro-11β-hydroxyprogesterone, 6α-fluoro-11α-hydroxyprogesterone, 6β-fluoro-11β-hydroxyprogesterone, 6β-fluoro-11-ketoprogesterone for 6α-fluoro-11-ketoprogesterone is productive of 1-dehydro-6α-fluoro-11β-hydroxyprogesterone, 1-dehydro-6α-fluoro-11α-hydroxyprogesterone, 1-dehydro-6β-fluoro-11β-hydroxyprogesterone, 1-dehydro-6β-fluoro-11α-hydroxyprogesterone and 1-dehydro-6β-fluoro-11-ketoprogesterone, respectively.

EXAMPLE 8

*Isomerization of 1-dehydro-6β-fluoro-11β-hydroxyprogesterone to 1-dehydro-6α-fluoro-11β-hydroxyprogesterone*

A solution of 0.15 gram of 1-dehydro-6β-fluoro-11β-hydroxyprogesterone (from Example 4) in twelve milliliters of chloroform and 0.1 milliliter of absolute alcohol is cooled to near zero degrees centigrade in an ice bath and a stream of anhydrous hydrogen chloride gas is gently bubbled through the solution for 2.5 hours while the temperature is maintained near zero degrees centigrade. The solution is then washed with dilute sodium bicarbonate and water, dried over anhydrous sodium sulfate, and evaporated to dryness under reduced pressure. Crystallization of the residue from acetone-Skellysolve B hexanes yields 1-dehydro-6α-fluoro-11β-hydroxyprogesterone.

In a similar manner 1-dehydro 6β-fluoro-11α-hydroxyprogesterone, and 1-dehydro-6β-fluoro-11-ketoprogesterone are converted to the corresponding 6α-fluoro compounds.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound of the formula:

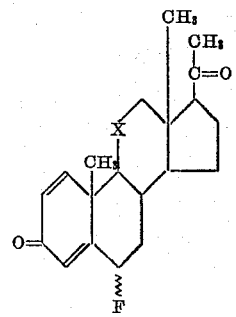

wherein X is selected from the group consisting of the carbonyl radical and the hydroxymethylene radical.
2. 1-dehydro-6-fluoro-11β-hydroxyprogesterone.
3. 1-dehydro-6α-fluoro-11β-hydroxyprogesterone.
4. 1-dehydro-6β-fluoro-11β-hydroxyprogesterone.
5. 1-dehydro-6-fluoro-11α-hydroxyprogesterone.
6. 1-dehydro-6α-fluoro-11α-hydroxyprogesterone.
7. 1-dehydro-6β-fluoro-11α-hydroxyprogesterone.
8. 1-dehydro-6-fluoro-11-ketoprogesterone.
9. 1-dehydro-6α-fluoro-11-ketoprogesterone.
10. 1-dehydro-6β-fluoro-11-ketoprogesterone.

References Cited in the file of this patent
UNITED STATES PATENTS

| | | |
|---|---|---|
| 2,837,464 | Nobile | June 3, 1958 |
| 2,838,501 | Campbell et al. | June 10, 1958 |
| 2,854,383 | Herzog | Sept. 30, 1958 |

UNITED STATES PATENT OFFICE
CERTIFICATE OF CORRECTION

Patent No. 3,004,044                              October 10, 1961

J Allan Campbell et al.

It is hereby certified that error appears in the above numbered patent requiring correction and that the said Letters Patent should read as corrected below.

Column 6, line 10, for "6β-fluoro-11-keto-progesterone" read -- 6β-fluoro-11α-hydroxyprogesterone or 6β-fluoro-11-ketoprogesterone --.

Signed and sealed this 3rd day of April 1962.

(SEAL)
Attest:

ERNEST W. SWIDER                                                DAVID L. LADD
Attesting Officer                                                     Commissioner of Patents